July 29, 1969  M. C. PFISTER  3,458,001
ELECTRICAL WEIGHER WITH CONTROL CIRCUITRY FOR SUPPLYING
DIGITAL INFORMATION TO UTILIZATION DEVICE
Filed Sept. 28, 1965  2 Sheets-Sheet 1

INVENTOR:
Marcel Charles Pfister
BY
Darbo, Robertson &
Vandenburgh
Attys

United States Patent Office 3,458,001
Patented July 29, 1969

3,458,001
ELECTRICAL WEIGHER WITH CONTROL CIRCUITRY FOR SUPPLYING DIGITAL INFORMATION TO UTILIZATION DEVICE
Marcel C. Pfister, 7 Rue d'Andlau,
Wolfisheim, Bas-Rhin, France
Filed Sept. 28, 1965, Ser. No. 491,052
Claims priority, application Germany, Sept. 28, 1964,
P 35,169
Int. Cl. G01g 23/38
U.S. Cl. 177—3                    2 Claims

ABSTRACT OF THE DISCLOSURE

A scanner has a detector rotating in a path adjacent the path of the scale pointer and concentric with the axis of the scale pointer. The detector produces an electrical measuring pulse as it moves past the pointer. The scanning means produces an electrical reference pulse as the detector means moves past a given point in its path. The scanning means has a pulse generator which produces a given number of electrical counting pulses at a constant rate during each cycle of rotation of the detector. A computer is connected to the scanning means to first determine the number of counting pulses between the reference pulse and the measuring pulse when an object is not on the scale and, secondly, determine the number of counting pulses between the reference pulse and the measuring pulse with an object on the scale, and determines the difference between the number of pulses. A memory is connected to the counter to store the count for each cycle. A device is connected to the memory to determine when the count varies from cycle to cycle and to release the count to a utilization device when the count ceases to vary.

---

The present invention relates to a weighing apparatus which supplies weight information to a weight utilization device. The weight utilization device may take many known forms. It may have a read-out in the form of printed or punched paper or cards, a pointer deflection, etc. It may store, accumulate, or perform computations on the weight information fed to it.

It is important that the indication and particularly the read-out takes place at a time where the scales are absolutely at rest and do not oscillate anymore. Frequently, it is also desirable to preclude the possibility of fraudulent manipulations which may perhaps consist of the operator manually raising or pushing down somewhat the scale platform during the weighing action.

For this reason according to the invention the weighing device is provided with a checking device which responds to changes in the weight information. The checking device blocks a re-transmission of the weight information as long as the checking device still signals changes in the weight information. Consequently, the weight information is only passed on and, for instance, printed out if the scales have assumed a state of complete rest, thus no more goods to be weighed are added and the scales do not oscillate any more. It is, however, also ensured that the scales cannot be influenced manually during the weighing action; for it is not possible, that is by raising the scales, to keep the hand so quiet that the checking device would not respond. Thereby, the re-transmitted weight information which may, for instance, be printed out or read into a data-processing machine permits an unobjectionable check on the weighing action and on the personnel. This may, for instance, be of significance in large retail stores, chain stores, slaughterhouses or the like.

The invention may be advantageously realized in that (a) interrogation means are provided for periodically interrogating the weight information and
(b) a memory is provided into which the interrogated weight information is read, and that
(c) the checking device responds to changes in the storage contents.

To obtain a safeguard against travel of the zero point, which may for instance be caused by residues, accumulated water or the like on the scales, in further modification of the invention provision is made that, if the weight information contained in the memory drops below a predetermined minimum value, this weight information will be subtracted automatically during the subsequent measuring action. Thereby, a rhythm "zero point checking-weighing-zero point checking-weighing" is forced and the tare will be automatically taken into consideration each time.

A preferred embodiment of the invention is presented in the drawings and described as follows.

Figures 2, 3:
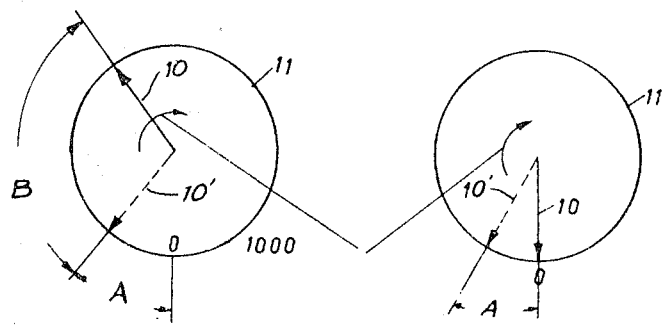
FIG. 2 is a front view of the scale dial and illustrates how the zero point check is made.
Figure 4:
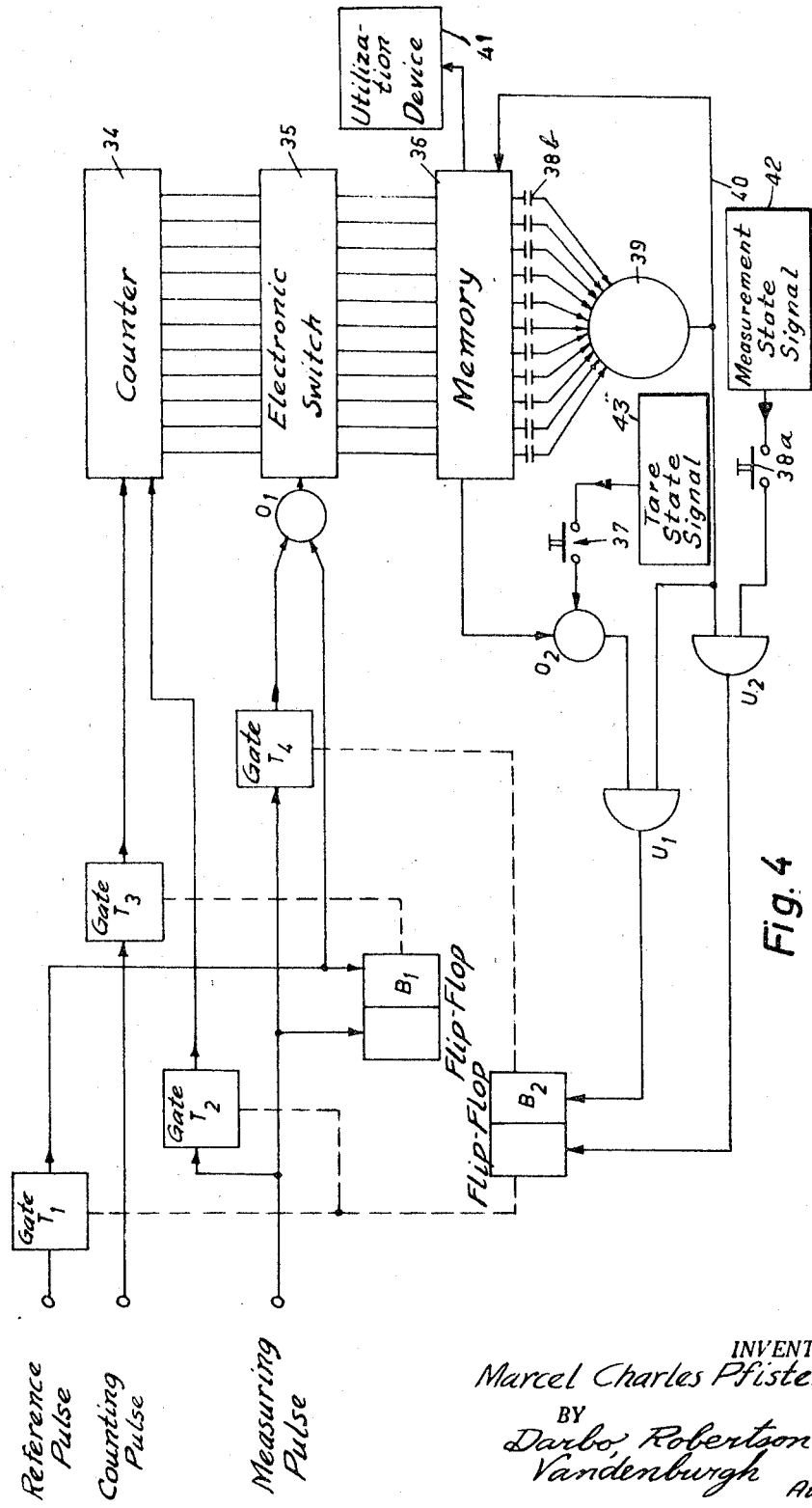

FIG. 3 corresponds to FIG. 2, but illustrates how the weight measurement is made after the zero point check; and FIG. 4 is a schematic circuit diagram of a device in accordance with the invention.

The mechanical structure

Figure 1:
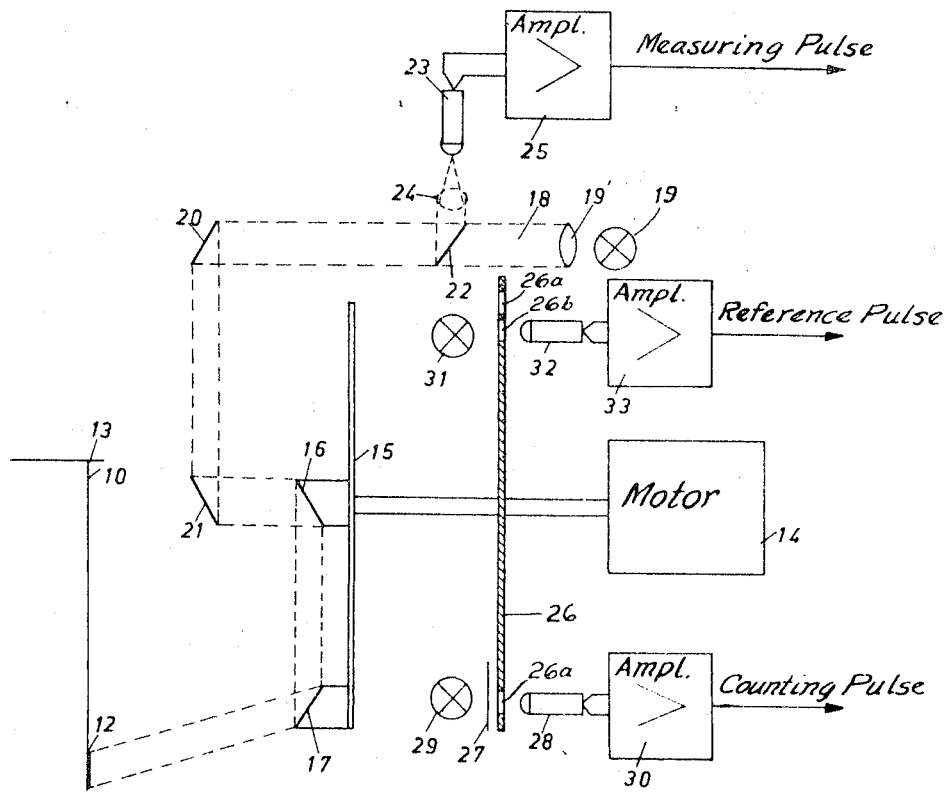
FIG. 1 illustrates schematically in side elevation a device for scanning a scale pointer, as used with the invention.

Reference numeral 10 designates the pointer of a weighing device (not shown in greater detail) which pointer moves across a dial 11. The position of pointer 10 is scanned by means of an optical-photoelectric scanning device illustrated in FIG. 1. To this end, the pointer 10 carries a reflex reflector 12, that is, a reflector which always reflects back the incident light into the direction of incidence. A motor 14 with a disk 15 is mounted with its shaft coaxial with the pointer axis 13. In the center of disk 15 there is located an inclined mirror 16 and at the periphery thereof there is positioned a second inclined mirror 17. A beam of light 18 from a stationary source of light 19 is focused through an objective 19' and is directed via stationary mirrors 20 and 21 along the axis of the motor and that of the pointer onto mirror 16. From there, it is deflected to mirror 17 and then onto the scale dial 11.

The beam of light 18 rotates about the face of the dial due to the rotation of disk 15 and mirrors 16 and 17. Once during each rotation the beam will strike the reflex-reflector mounted on the pointer and will be reflected back in itself along the described path. The point in the 360° path at which such reflection occurs, is of course, determined by the position of pointer 10. A partially transmitting mirror 22 reflects the returning light to a photoelectric detector 23 on which it is focussed by means of an objective 24. This will cause a pulse at the detector 23 which pulse is amplified by means of an amplifier 25. The moment at which this pulse appears is representative of the position of pointer 10. Herein, this pulse is referred to as the "measuring pulse."

The shaft of motor 14 also has a disk 26 mounted thereon. Disk 26 has a plurality of radial "counting" slots 26a separated by webs, for instance 1000 slots at the periphery thereof. In front of disk 26 there is arranged a diaphragm 27 with corresponding slots and webs. Every ¹⁄₁₀₀₀ rotation (i.e., 0.36 degree) of disk 26 the slots of the disk will overlap the webs of diaphragm 27 and be cleared again. When this occurs photoelectric detector 28 obtains a light pulse from a lamp 29 arranged on the other side of disk 26 and diaphragm 27. Thus, detector 28 supplies a "counting pulse" which is amplified by means of an amplifier 30. The interrogation means comprises the apparatus for producing and determining the number of counting pulses between the scale zero and the pointer setting as determined by the measuring pulse.

In addition to the counting slots 26a, disk 26 has a single "reference" slot 26b therethrough. The reference slot 26b is at a different radial distance than that at which the counting slots are positioned. A lamp 31 shines onto a photoelectric detector 32 when the reference slot is therebetween to produce a "reference pulse." This pulse is amplified by an amplifier 33. The reference slot is arranged so that the reference pulse appears simultaneously with the measuring pulse when the pointer 10 is in zero position.

The circuitry

FIGURE 4 illustrates the associated circuitry.

The counting pulses pass through a gate $T_3$ onto a counter 34. The counting capacity of counter 34 corresponds to the number of the counting slots on disk 26, and thus to the number of counting pulses which are supplied upon rotation of the disk 26. After such a number of pulses the counter 34 returns to zero. For convenience of illustration it was assumed that disk 26 had 1000 slots and thus supplies 1000 pulses with one rotation thereof. Also, counter 34 may be set back to zero by the measuring pulse via a gate $T_2$.

The contents of the counter are transmitted to a memory 36 via an electronic switch 35. Counter 34 has a plurality of stages which, for example, are flip-flops. Each stage has two outputs. The two outputs of each counter stage are connected to one input each of a storage cell in memory 36 via one AND-gate each in switch 35. A common carrier pulse is applied to the second inputs of the AND-gates. This carrier pulse may either be the reference pulse which is supplied via a gate $T_1$ and an OR-gate $O_1$, or the measuring pulse which is introduced via a gate $T_4$ and OR-gate $O_1$.

The gates $T_1$, $T_2$, $T_3$ and $T_4$ are controlled by two bistable multivibrators (flip-flops) $B_1$ and $B_2$. $B_1$ controls gate $T_3$ and therewith the introduction of the counting pulses into counter 34. Flip-flop $B_1$ is caused to assume one state by the measuring pulse, in which state it keeps gate $T_3$ open. By means of the reference pulse it may be caused to assume a second state in which gate $T_3$ is blocked. The bistable multivibrator $B_2$ controls the modes of operation "zero point checking" and "measurement." In one state it is effective to keep gates $T_1$ and $T_2$ blocked and gate $T_4$ open. In the other state of the bistable multivibrator $B_2$ the gates $T_1$ and $T_2$ are open and gate $T_4$ is blocked.

The flip-flop $B_2$ by two inputs thereof may be caused to assume the one or the other state. One input switching the flip-flop $B_2$ has an output of memory 36 applied thereto via an OR-gate $O_2$ and an AND-gate $U_1$, and obtains L-signals if the weight information contained in memory 36 drops below a predetermined minimum value for "zero point checking" or "taring." This changing the state to "taring" also can be effected manually by means of a switch 37. The other input for changing to "measurement" is caused to assume the L-state by means of a switch 38a.

The outputs of the storage cells of memory 36 are connected with the input of a NOR-gate 39 via capacitors 38b. The output of the NOR-gate 39 is zero as long as the storage contents are still changing in some way, since currents are then still flowing through the capacitors 38b. It is not until the memory 36 has assumed a complete state of rest, that the output of the NOR-gate 39 becomes L.

This L output via line 40 releases the re-transmission of the weight information to a utilization device 41 so that the weight may for instance be printed out thereby. In addition, the output of the NOR-gate 39 connects to one input each of the two AND-gates $U_1$ and $U_2$ through which the switching signals for "taring" or "measurement" respectively are supplied to the inputs of the bistable multivibrator $B_2$. Thus, the change of state is possible only if the memory 36 has come to rest and the indication "stands." The arrangement as herein described functions as follows:

Taring

If pointer 10 is located in the lower portion of the measuring range, thus the indication is approximately zero, the arrangement shall operate in the mode "taring." With such indication it is assumed that any deviation of the pointer from the zero point is due to a tare, as for example, packing material or water on the scales.

The pointer 10 is now periodically scanned by the beam of light (scanning ray) 18 and upon detection of the pointer the detector 23 supplies the measuring pulse. At the moment where the scanning ray 18 passes through the dial zero point, there will be a reference pulse from detector 32. Also the detector 28 supplies 1000 counting pulses with each full rotation of disk 26. In the mode of operation of "taring," the counting pulses are counted starting from the measuring pulse up to the reference pulse. Thus in FIG. 2 assume that pointer 10 is displaced by an angle A to the position 10'. The counting commences when the beam of light 18 detects the pointer at 10' and continues to the zero point on the scale dial. If, for instance, pointer 10 is displaced from the zero point by $25/1000$ of the total deflection thereof, counter 34 upon every rotation of the disk counts up to 975. This number will then be transmitted respectively by the reference pulse to the memory. The measuring pulse is effective to cause a resetting of counter 34 to zero and a new counting is initiated.

The circuitry clearly shows how this is attained, the memory 36 contains a weight information which is below a predetermined minimum value. Thus, via $O_2$ and $U_1$ it switches the bistable multivibrator $B_2$ to "taring" or "zero point checking." Thereby, gate $T_1$ is opened. The reference pulse therewith controls the transmission of the counter reading to the memory 36 via $O_1$ by means of the electronic switch 35. Gate $T_4$ is blocked so that the measuring pulse does not effect such a transmission. Also, the reference pulse blocks gate $T_3$ via the bistable multivibrator $B_1$ and therewith cuts off the counting pulses from counter 34. The measuring pulse via gate $T_2$ resets the counter 34 to zero and changes the flip-flop $B_1$, so that gate $T_3$ will be opened and the path of the counting pulses released to counter 34. Counting is thus effected from the measuring pulse to the reference pulse. For, during this time, $T_3$ is opened. With the reference pulse the counter reading is transmitted to memory 36 and with the measuring pulse the counter is set back to zero respectively.

Now, the counter 34 has for instance stored therein the figure 975.

Measurement

Change-over to "measurement" is effected now and a commodity to be weighed is put on the scales. This is done by two signals to the input of AND-gate $U_2$. Since the pointer is stationary, there is an output from NOR-gate 39 to line 40. Switch 38a is manually closed to apply a measurement state signal from generator 42 to the other input of AND-gate $U_2$. Thus, there is a signal from AND-gate $U_2$ to actuate flip-flop $B_2$. Upon the additional weight being then added, the pointer 10 moves an additional angle B to the position illustrated in FIG. 3.

In the "measurement" state gates $T_1$ and $T_2$ will be blocked. Then, the reference pulse has no further influence on the bistable multivibrator $B_1$ and the electronic switch 35. The measuring pulse causes the bistable multivibrator $B_1$ to assume a state in which gate $T_3$ is opened, and it remains in such state. Gate $T_2$ is also blocked which is effective to cause the measuring pulse not to reset the counter to zero anymore. However, gate T₄ is now open. This means that the electroniec switch 35 is now being actuated by the measuring pulse.

Counter 34 now receives pulses continuously. It does, however, not start counting at zero, but at a counter reading which resulted during taring from the difference of measuring and reference pulses. Thus, with reference to FIGS. 2 and 3 it only starts counting after the beam 18 has traversed the angle A corresponding to a pointer displacement to 10'. This is a figure close to the counter capacity. It was assumed above, that this be 975, corresponding to a "tare" of 25 pulses. Shortly after the counting commences, the counter capacity is reached and the counter will start counting again from zero onward. As soon as the measuring pulse appears (i.e. when the beam 18 detects the pointer 10 in the position illustrated in FIG. 3), the counter reading given at this moment will be transmitted to the memory via T₄. This counter reading is "phase-shifted" relative to the number of pulses which actually occurred by the 25 pulses which had to be counted first into the counter before the counter capacity was reached and the counter set back to zero state. Of course, this "phase shift" will also be maintained during the subsequent scanning cycles so that each time a figure in accordance with "indicated weight" less "tare" will be transmitted to the memory 36.

As soon as the pointer 10 has come to rest the storage contents remain constant. No signals further will be applied to the NOR-gate 39 via the capacitors 38b, since there is no change anymore and the output of the NOR-gate 39 becomes L. Thereby, a re-transmission of the weight information is released to the utilization device 41. Thus, the weight may for instance be printed out.

To change back to "taring," the scale is empty (except for whatever tare weight may be present) so that there is a constant output from NOR-gate 39 and a signal at line 40. Since the count appearing in memory 36 will be approximately zero, it is below the predetermined minimum so that there is a signal from memory 36 to OR-gate 40 O₂. These two signals act through AND-gate U₁ to reset flip-flop B₂ to the "tare" condition. Switch 37 permits also changing over to "taring" if the stored weight exceeds the predetermined minimum value. Thus, if necessary, it is, for instance, possible to disregard heavier baskets or cases. Thus, by manually closing switch 37 a tare state signal from generator 43 is applied to AND-gate U₁ through OR-gate O₂. This, along with the signal at line 40 from NOR-gate 39, is applied to flip-flop B₂ through AND-gate U₁ to reset the flip-flop.

The invention may be modified in various manners. Instead of the capacitors 38b and the NOR-gate 39 two memories may be provided permitting the respective comparison of one counter reading with the one obtained during the preceding scan. In case of coincidence a signal is supplied to a further counter and the release will take place if with a predetermined number of subsequent scans coincidence was determined.

The advantage that resides in the described arrangement for pointer scanning is that it may also be attached later to conventional weighing devices and has no effects on the measuring device.

I claim:

1. In an apparatus for scanning a pointer deflected in accordance with a measured variable and for transforming this measured variable into digital information and having a cyclically operating scanning device to scan the deflection range of the pointer to produce a measuring impulse when scanning past the pointer, an impulse generator coupled with the scanning device to produce a given number of counting impulses during each scanning cycle, a device to produce a reference impulse at a fixed point of the scanning cycle corresponding to the dial zero point, and counter means to which the impulses from the impulse generator are applied, said apparatus being characterized by the combination of the folowing features:

the capacity of the counter means is equal to the number of the pulses produced by the impulse generator during a full scanning cycle;

memory means;

electronic switch means connecting the counter means and the memory means to control the transfer of the count present in the counter means to the memory means, said electronic switch means having a control input effective when a signal is there applied to effectuate said transfer;

first gate means connected to said reference impulse device to receive said reference impulses, an output and a control input, said control input being effective to open said gate means when a signal is appled thereto to transmit the reference impulse to said output, said gate means being effective to block the reference impulses from said output when no signal is applied to the control input thereof;

first flip-flop means having two inputs and an output, said flip-flop means having two states, at one of which a signal is produced at the output thereof, one of said two inputs being connected to the output of the first gate means to receive said reference impulse to establish the flip-flop means in said one state, said other of said two inputs being connected to said scanning device to receive said measuring impulse to establish the flip-flop means in the other of said two states;

second gate means connected between the impulse generator and the counter means to pass counting impulses to the counter when the second gate means is open and to block them from the counter means when the second gate means is closed, said second gate means having a control input connected to said output of the first flip-flop means;

third gate means connected to the scanning device to receive the measuring impulse and to the counter means to pass the measuring impulse to the counter means when the third gate means is open and to block the measuring impulse from the counter means when the third gate means is closed, said third gate means having a control input to establish whether the third gate means is open or closed;

OR-gate means having two inputs and an output, said output being connected to said control input of the electronic switch means, one of said inputs of the OR-gate means being connected to the output of the first gate means;

fourth gate means connected to the scanning device and the other input of the OR-gate means to apply a measuring impulse to the electronic switch means when the fourth gate means is open and to block said measuring impulse when the fourth gate means is closed, said fourth gate means having a control input;

second flip-flop means having two inputs and two outputs, said second flip-flop means having two states at one of which a signal is produced at one output thereof and at the other of which a signal is produced at the other output thereof, said one of said outputs being connected to the control input of the first gate means and to the control input of the third gate means, the other of said outputs being connected to the control input of the fourth gate means; and control means connected to the memory means and to the inputs of the second flip-flop means to establish said second flip-flop means in said one state when the count stored in said memory means loops below a predetermined value and to establish said second flip-flop means in the other state by a manually triggered signal.

2. In an apparatus as set forth in claim 1, wherein said memory means has first output means at which signals are produced indicative of the count stored in said memory means and second output means at which a signal is produced when the count stored in the memory means is below said predetermined value; and said control means comprises:

NOR-gate means having an output and input means connected to the first output means of the memory means to produce a signal at the output of the NOR-gate means when the count at its input means is unchanging, first AND-gate means having two inputs and an output, said output being connected to one input of the second flip-flop means, means connecting the two inputs of the first AND-gate means respectively to the second output means of the memory means and to the output of the NOR-gate means, manually operable means to produce a signal, second AND-gate means having two inputs and an output, said output being connected to the other input of the second flip-flop means, and means connecting the two inputs of the second AND-gate means respectviely to the manually operable means and to the output of the NOR-gate means.

References Cited

UNITED STATES PATENTS

| | | | |
|---|---|---|---|
| 2,938,126 | 5/1960 | Adler | 250—219 |
| 2,974,863 | 3/1961 | Williams | 235—151 |
| 3,039,686 | 6/1962 | Bell | 235—151 |
| 3,315,067 | 4/1967 | Bell | 235—151.33 |
| 3,042,128 | 7/1962 | Bell | 177—210 |
| 2,963,222 | 12/1960 | Allen. | |
| 3,055,585 | 9/1962 | Bell et al. | 235—160 |
| 3,268,020 | 8/1966 | Puechberty | 177—3 XR |
| 3,329,807 | 7/1967 | Currie et al. | 177—3 XR |

FOREIGN PATENTS 355,963  9/1961  Switzerland.

ROBERT S. WARD, Jr., Primary Examiner

U.S. Cl. X.R.

177—164; 235—58

UNITED STATES PATENT OFFICE
CERTIFICATE OF CORRECTION

Patent No. 3,458,001                              July 29, 1969

Marcel C. Pfister

It is certified that error appears in the above identified patent and that said Letters Patent are hereby corrected as shown below:

Column 6, line 70, "loops" should read -- drops --.

Signed and sealed this 21st day of April 1970.

(SEAL)
Attest:

Edward M. Fletcher, Jr.                      WILLIAM E. SCHUYLER, JR.
Attesting Officer                                    Commissioner of Patents